April 25, 1933.    A. McL. NICOLSON    1,906,215
PROJECTION SYSTEM
Filed July 10, 1930
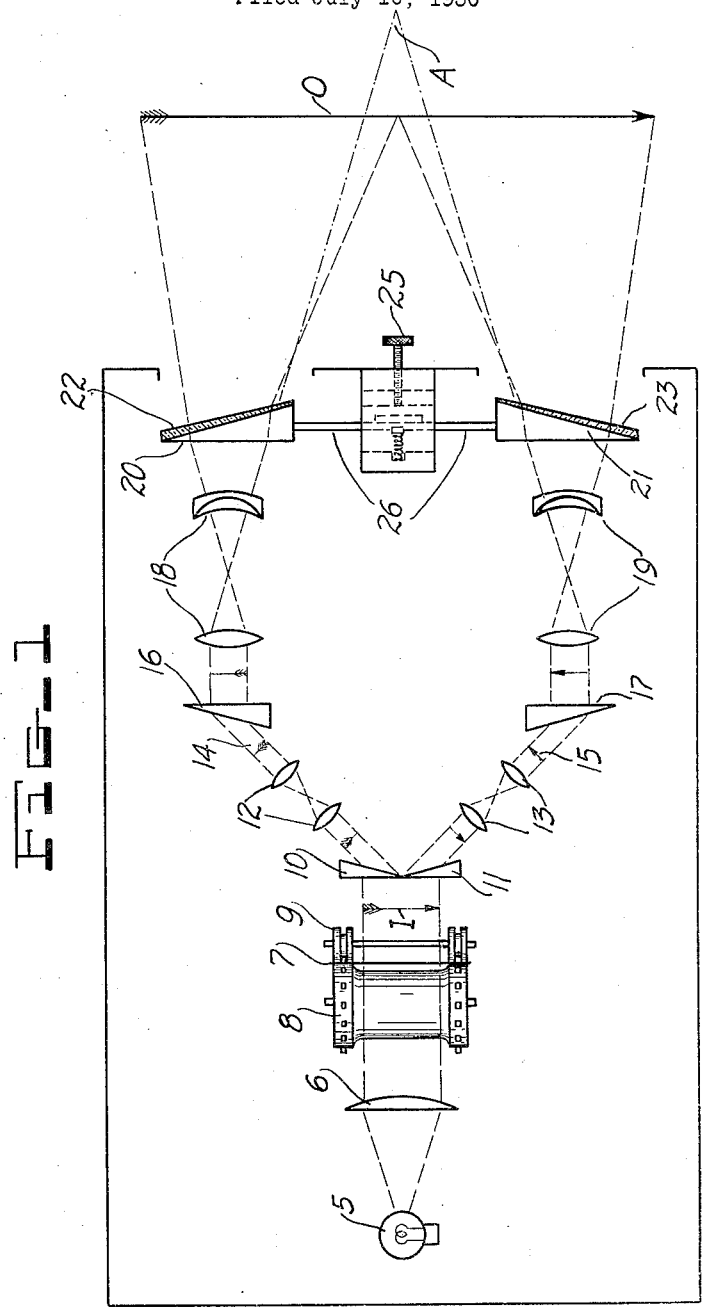
INVENTOR
Alexander McLean Nicolson
BY
Irl R. Goshaw
ATTORNEY Patented Apr. 25, 1933

1,906,215

UNITED STATES PATENT OFFICE

ALEXANDER McLEAN NICOLSON, OF NEW YORK, N. Y., ASSIGNOR TO COMMUNICATION PATENTS, INC., OF NEW YORK, N. Y., A CORPORATION OF DELAWARE

PROJECTION SYSTEM

Application filed July 10, 1930. Serial No. 466,999.

This invention relates to light projecting systems, and particularly to such systems employed for the projection of motion pictures.

An object of this invention is to obtain large magnifications within short distances between the objective lens of a projector and a receiving screen.

Another object of the invention is to eliminate from projections at large angles any light distortion generally accompanying such projections.

In the usual projection of motion pictures, the projection machine is located at one side of the building and the receiving screen at the other side of the building, the distance of projection being sufficiently great to permit of a small objective angle of projection in which no light dispersion difficulties are encountered. With such arrangements, thin long focus lenses can be employed in which spherical and chromatic aberration is negligible. The present projection system is adapted to project pictures at short distances from the screen in large proportions, without the deleterious blurring and coloring at the edges of the pictures. Such a projection machine may be employed behind the screen on a stage, or in any location where the distance between the projector and screen is comparatively short.

The principles of this projector may also be employed in the projection of "grandeur" pictures, wherein such projection has hitherto been accomplished through the use of larger film and larger projection apparatus.

The projection is accomplished through the dividing of the light after it has been passed through the film into two beams, each beam having light variations according to one-half the film in the transverse direction. These light beams are separated and magnified in the usual way individually, and then projected onto one-half sections of the screen. The two projections are reunited in the proper place by prismatic lenses which shift the focal points of the magnifying lens. Chromatic aberration is eliminated by the use of correcting material on the faces of the objective prismatic lens.

The preferred embodiment of this invention is represented in the appended drawing, the details of which will be understood from the following description taken with reference to the same:

The figure shows a diagrammatic plan view of the projection system.

A source of light 5 is projected through a convex lens 6 to obtain parallel light for projection through a film 7. The film 7 is shown between a driving sprocket 8 and idler roller 9, which may be the usual driving mechanism of any motion picture projector. Assuming that the image on the film is I, this image is projected upon prismatic lenses 10 and 11 which divide it and shift each one-half of the total light beam at diverging angles. By the use of short focus inverting lenses 12 and 13, the image in each path is inverted as shown at 14 and 15. The beams of light are again reverted to a direction parallel with the original light beam by a set of prismatic lenses 16 and 17. These lenses are, preferably, the exact size of lenses 10 and 11, respectively, so that any chromatic aberration caused by the lenses 10 and 11 will be compensated for and corrected by the lenses 16 and 17.

After passing through the lenses 16 and 17, the beams of light are magnified through well corrected lens systems 18 and 19, which enlarge each one-half image of the original image I. This magnification of each half image can be of a magnitude commensurate with that obtainable when magnifying the entire image. These images are then projected as shown by the ray envelope lines upon a screen represented by the large arrow O. Between the magnifying lens systems 18 and 19, and the screen, are the prisms 20 and 21 with the chromatic aberration correction mediums 22 and 23. These prisms are for the purpose of shifting the foci of the magnifying lens so as to accomplish the joining of the half sections of the picture. The lenses are adjusted by means of a thumb screw 25 which moves the lens supporting rods 26. It is to be noted that in the present system the screen would have to be placed at a point A if the prismatic lens were not used. With these lenses, therefore, focussing of the projector is facilitated, and especially fine adjustments may be made to prevent any fringe effect at the jointure of the two one-half projections.

It is to be noted that in the above described projection system, each one-half of the total image is magnified to the fullest extent possible without causing dispersion at the edges of the images. Furthermore, the usual projection magnifying lens system may be employed and a double width picture is obtainable from a standard film.

This system may also be employed for the projection of still pictures in the form of slides, or of reflected photographs from books, pamphlets and the like.

Although only one embodiment of the invention is disclosed above, nevertheless other adaptations involving the principles set forth are considered to be within the scope of the appended claims.

What is claimed is:

1. A light projecting system comprising a source of light, means for modulating said light, means for dividing said modulated light into a plurality of portions, means for magnifying each of said portions separately, and means for joining said portions to form the original light modulations.

2. In a projection system, a source of light, means for projecting said light upon a picture image in a single beam, means for dividing said light image into a plurality of sections, means for magnifying each of said sections, and means for joining said sections during projection to form a magnified image of the original image.

3. In a picture projection system, a film having images thereon, a beam of light intercepted by said film to form a complete light image of each film image, an optical system for dividing said light images into a plurality of portions, a screen, and means for projecting said portions on said screen at mutually exclusive positions.

4. In a picture projection system, a film having a plurality of images thereon, a source of light intercepted by said images to form a complete light image of each film image, an optical system for dividing said light images into two portions, a screen, and means for projecting said portions on said screen at mutually exclusive positions.

5. In an optical system comprising a source of light in the form of a beam, means for varying the intensity of the beam of light in accordance with an image to be projected, means for dividing said varied beam into sub-beams, means for individually magnifying each sub-beam, and means for joining said portions at equal distances from said magnifying means.

6. The method of projecting picture images at wide angles comprising modulating a light beam in accordance with the light and dark intensities of an image, dividing said modulated beam into a plurality of portions, magnifying said portions and joining said portions to form the original image.

7. The method of projecting picture images at wide angles comprising modulating a light beam in accordance with the light and dark intensities of an image, dividing said beam into a plurality of portions, independently magnifying said portions and projecting said portions on mutually exclusive areas.

8. In combination in a projection equipment for backstage or like projection of abnormal wide angle on a relatively large screen, a light source, means for modulating the light from said source, a lens system dividing said modulated light into a plurality of portions, means for independently magnifying each of said portions, and means for projecting and joining said portions on mutually exclusive areas at equal distances from said projection apparatus.

9. A combination in accordance with claim 8 in which said last mentioned means comprises a corrected prismatic lens in operative relation to each separate portion of said modulated light mounted on a unitary adjusting device for shifting the light beam envelope of the respective portions.

Witness my hand this 8 day of July, 1930, at the city of Newark, in the county of Essex, and State of New Jersey.

ALEXANDER McLEAN NICOLSON.